Aug. 6, 1974 L. CANONICA ET AL 3,828,082

INSECT MOULTING HORMONES, AND METHOD FOR THEIR PREPARATION AND USE

Filed Jan. 14, 1972

United States Patent Office 3,828,082
Patented Aug. 6, 1974

3,828,082

INSECT MOULTING HORMONES, AND METHOD FOR THEIR PREPARATION AND USE

Luigi Canonica, Milan, Bruno Danieli, Cesano Maderno, and Giorgio Ferrari, Milan, Italy, assignors to Dauten S.A., Roveredo, Switzerland Filed Jan. 14, 1972, Ser. No. 217,842
Claims priority, application Italy, Jan. 18, 1971, 19,466/71; July 29, 1971, 7,806/71
Int. Cl. C07c *169/60*
U.S. Cl. 260—397.25 6 Claims

ABSTRACT OF THE DISCLOSURE

A biological insecticide, based on insect moulting hormones, is disclosed, the active hormonal principle being extracted from the seeds of Kaladana plants: the latter are a vegetable species belonging to the Convolvulaceae family, Ipomaea section, genus Calonyction (Choisy) Hallier f. A method is described for carrying out the extraction of the active principle, which is a crystalline mixture of crustecdysone, makisterone A, ecdysone and a newly discovered chemical species, which has been called muristerone herein. The hormones in question are used at concentrations of at least 0.1% of active principle, to control various agricultural pests such as *Doryphora decemlineata, Pieris brassicae,* and others.

Figures 1, 2, 3, 4:
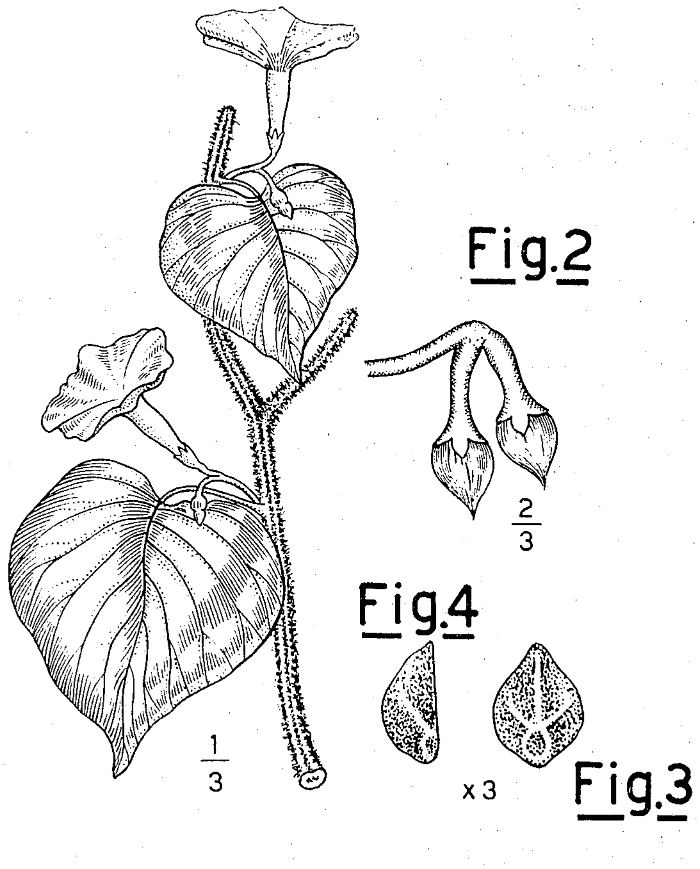

This invention relates to steroid hormones which control the metamorphosis of insects and, more particularly, a method for their preparation and their specific use as biological insecticides.

Among the insect moulting hormones to which the present invention is related, a few were already known in the past, such as crustecdysone (also called ecdysterone), the makisterone A and ecdysone, whereas another one, the muristerone, to be defined in more detail hereinafter, has never been described or identified heretofore.

The crustecdysone, that is, 2β,3β,14α,20R,22R,25-hexahydroxy-5β-cholest-7-en-6-one, having the formula:

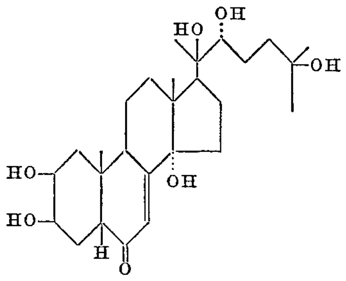

(I)

has been isolated for the first time in the past in a Crustacean, the *Jasus Calandei* (Chem. Com., 1966, p. 37) in an amount of 2 milligrams of pure hormone from one ton (metric) of Crustacea. Its presence has also been ascertained in *Bombyx mori,* along with ecdysone.

It is also present in the insect *Antherea pernyi* (200 mg. from 31 kgs. of pupae).

It has been isolated from *Podocarpus elatus* plants, accompanied by plant steroids as impurities (Chem. Com., 1966, p. 905), in an amount as high as 0.05% of the weight of the vegetable material (Chem. Com., 1968, p. 971); it occurs also in *P. macrophyllus* (T. Lett., 1968, p. 3883).

Furthermore, it is present in *Polypodium vulgare* L. (0.07%–1.0% of dry weight) (Phytochemistry, 9, 1247 (1970)).

The makisterone A, that is, 2,3β,14α,20R,22R,25-hexahydroxy-24-methyl-5β-cholest-7-en-6-one, having the formula:

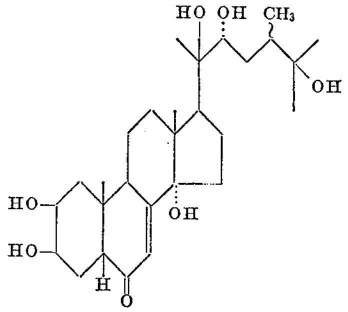

(II)

has been found to be present in *Podocarpus macrophyllus* in an amount as high as 0.001% (T. Lett., 1969, p. 3887).

In the family of polyhydroxyl steroids, the ecdysone, having the formula:

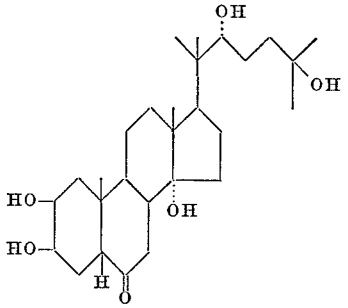

(III)

had been first isolated and identified (see A. Butenandt, P. Karlson and co-workers, Ann. Chem., 662, 1 (1963)) and this has been the starting point of research regarding the properties of these steroids and their implications in the biological cycle of insects.

During recent years, as evidenced by the chemical and and in particular patent literature, a number of processes have been described for their preparation. However, the main problem remained unsolved heretofore, i.e. to produce them in an industrially acceptable amount, that is in high yields and at reasonable first costs. As a matter of fact, all of the processes which have been studied in the past have the defect of being extremely expensive and, above all, of being very intricate.

It has now been found, and this is the subject-matter of the present invention, that such hormones, both as pure-substances and in the form of a partially purified extract, can be produced in quantities which are both industrially and economically acceptable, by extraction from plants of the Convolvulaceae family, Ipomaea section, Calonyction genus (Choisy)Hallier f.

More particularly, it has been found that the extraction of the steroid hormones in question gives quite appreciable results with plants, as suggested above, which are found spontaneously growing in mountainous and sub-tropical areas, especially in the sub-Himalayan belt (India) where they are called "Kaladana" by the natives, a term which encompasses, in actual practice, a number of closely related plants whose identification is controversial. As a matter of fact, in the publication Chopra's Indigenous Drugs of India, U. N. Dhur and Sons Private Limited, Calcutta, 1958 (p. 51) the scientific term of Ipomaea hederacea is indicated as corresponding to Kaladana.

Conversely, in J. Pharm. Sc., vol. 56, No. 6, p. 771, 1967 it is affirmed, in the context of an article by Gupta and co-workers, that Kaladana is the name under which the Ipomaea muricata is commonly known. In the "British Pharmaceutical Codex," 1949, p. 459, it is reported, conversely, that Kaladana, consists of dried seeds of Ipomaea hederacea.

The Kaladana which is of interest in the case of the present invention is a plant which surely belongs to the above specified family, sections and genus, and which has the following characteristic features:

A perennial lianous plant having very long twining shoots, which are branching, herbaceous but wood-like hardened at the base and incised by 1 or 2 longitudinal grooves which are fitted with closely arranged short herbaceous prickles, these being slightly bent downwards and having an obtuse apex, and being non-stinging.

Akin to the *C. muricatum* (L.) G. Don, it differs therefrom by the alternate cordate-acuminate leaves, which are neither lobate nor sagittate and have slightly sinuate-wavy margins and larger dimensions: the length is up to 25 cms. approximately and the width reaches 22 cms., the leaf-stalk being from one-half to one-third in length with respect to the length of the leaf and slightly expanded at the base and scarcely hairy in that area.

The flowers are in number of 2 or 3 on an axil peduncle, the corolla is an elongate conical tubule of a whitish colour, of a lesser length than in *C. muricatum* (about 7 cms.) the edge is funnel-shape and rotated, obtusely five-lobed and with a diameter of about 8 cm., the colour being a more or less intense lilac or rosy hue, the flower blooming in night time, the stamina and the style being non-protruding from the corolla tubule, the calyx having acuminate and applied lobes which however are expanded until becoming ovate-acuminate and slightly divergent as the capsule ripens.

The capsule is pendulous, ovate-apiculate having three (from two to four) black seeds in the form of a gore (the outer surface being ovoidal and the inner faces planar), minutely tomentose-granular, having an average length of 7 mms. and a width of 6 mms.

As to its habitat, the plant grows spontaneously in the mountainous sub-Himalayan region of India and West Pakistan, up to an altitude of 1,500 meters. The drug, composed by the seeds, is locally used as an aperient whereas the powder is used as an antipyretic.

In order that any reasonable doubt may be dispelled, the accompanying drawings show:

In FIG. 1 a shoot of the subject plant with leaves and flowers,

In FIG. 2 the ripe seed-carrying capsules, and

In FIGS. 3 and 4 the front and side views of a seed, respectively.

As outlined above, the present invention is concerned with the steroid hormones enumerated in the forgoing, which control the metamorphosis of insects.

The most important aspect of the invention lies in that, as starting from parts of Kaladana which are rich in such hormones, and more particularly from the seeds thereof, it becomes possible to obtain such hormones in considerable amounts and at both an economically and industrially acceptable first cost.

Another aspect of the present invention lies in the fact that it is possible to isolate the aforementioned hormone in high yields (e.g. 0.5% to 1% of fresh seeds), from Kaladana using a very simple and quick procedure at an extremely high degree of purity.

Still another aspect of the present invention lies in the fact that a new substance has been isolated and identified in the Kaladana extract, said substance also having the structure of a polyhydroxylated steroid, to which the name of muristerone has been attributed and whose properties and features will be defined as the present disclosure proceeds.

An aspect of the present invention which is as much important lies in the fact that the extract obtained from Kaladana has been proved to possess a powerful biologically insecticidal action, with a wide spectrum, in addition to its corollary effect as a strong antifeeding agent against insects.

In addition to such an effect of protection of plant cultures, the polyhydroxylated steroids the subject of the invention find a use in the pharmaceutical and veterinary fields as already recognized by the conventional art.

On considering at the outset the process of extraction carried out on Kaladana, parts of the plant, preferably the seeds thereof, after being air dried or by other suitable means, are ground in a mill so as to obtain a groat-like flour, which is subjected as the first step to a cold defatting step using a hydrocarbon solvent, preferably petroleum ether or a ligroin (boiling range 80° C.–90° C.), so as to strip it from the fats contained therein.

The drug is subsequently and exhaustively extracted with a mixture consisting of a chlorinated aliphatic hydrocarbon solvent, an aliphatic alcohol and a nitrogen containing base. The extract is preferably repeated a number of times at room temperature, under stirring, and then by the chlorinated aliphatic solvent only, still under stirring and at room temperature.

Every extraction run, in the case of a batch process, lasts about twelve hours: in any case the extraction process is considered to be terminated when the last extracted proves to be negative to the Libermann test for recognizing steroids. Obviously, the extraction can be carried out as a continuous process with the mode of operation which is self-explanatory for anyone skilled in the art.

The combined extracts are then evaporated to a reduced volume in vacuo and at temperatures not over 40° C. and, from the concentrate, which is allowed to stand, a crystalline product is separated, which will be called hereinafter a total crystallizate T, which contains the expected hormones.

The extraction mixture of the drug comprises, as indicated above:

(a) A chlorinated aliphatic hydrocarbon solvent, preferably composed by chloroform, although carbon tetrachloride, methylene chloride or trichloroethylene can be used, (b) An aliphatic alcohol containing from 1 to 4 carbon atoms, methanol being preferred, and (c) A nitrogen containing base selected in the group consisting of ammonia and amines.

The ratios of the several components of the extraction mixture are selected as a function of the components of the same mixture: in the case of the chloroform/methanol/ammonia mixture, the volume ratios are 9 to 0.9 to 0.1.

Be it understood however, that many obvious changes and modifications are acceptable both in the solvents and reactants used in the extraction step and in the conditions under which the extraction is carried out, the latter being, as itself, an operation which is well known in the appertaining art.

In order that the steroid hormones as contained in the total crystallizate T may be identified, the crystallizate, upon washing with a small amount of cold chloroform, is dried and analyzed.

The chromatographic analysis on a thin layer of silica gel G, using as the developing system a mixture of chloroform-ethanol-water (80:19:1) and as the visualizing agent of the spots the vanillin-sulphuric acid reagent, by heating to 120° C. and for 10 minutes, shows that the above mentioned crystalline precipitate contains a number of compounds, two of which are crustecdysone and makisterone A, respectively. As a fatter of fact, there are obtained, among others: a blue spot having R*f* 0.22, a violet spot with R*f*=0.20, characteristic of makisterone A, and a yellow spot, R*f*=0.15, which is characteristic of crustecdysone.

In connection with the above-mentioned blue spot it has been found that in the total crystallizate T, in addition to crustecdysone and makisterone A, other polyhydroxylated sterols are present, among which one can recognize, in substantial amounts, both the ecydysone and a new substance, muristerone.

The term muristerone is intended to identify a newly discovered polyhydroxylated sterol whose properties confirm that it belongs to the same family of polyhydroxylated sterols described above. It is characterized by the following properties: (1) its IR absorption spectrum in KBr shows characteristic bands at the wave numbers of 3600–3200, 1660, 1630 cm.$^{-1}$ and (2) the UV absorption spectrum in methanol shows $\lambda_{max.}$=235 nm. ($\epsilon$=9050). The optical rotatory power is $[\alpha]_D^{20}=+49.6°\pm1°$ (concentration c.=1.02 in pyridine).

When treated with acetone in the presence of a small amount of an acid catalyst, such as phosphomolybdic acid, the product yields a mixture of mono- and diacetonide, which are separated by chromatography on a silica gel column, by eluting with chloroform-ethanol (99:1 by volume) and subsequently with 98.5:1.5. Using the ratio 99:1 the diacetonide is obtained which on acetylation with acetic anhydride in pyridine yields a diacetonide monoacetate, m.p. 208° C.–214° C. (Kofler) after crystallization from hexane. By eluting with chloroform-ethanol 98:1.5 one obtains the monoacetonide which is acetylated in the same way as before a mixture being obtained of monoacetonide triacetate and monoacetonide diacetate. These are separated by chromatography on alumina by eluting with chloroform-ethanol 99:1 and subsequently with chloroform-ethanol 98.5:1.5. In the former case, one obtains the monoacetonide triacetate, m.p. 255° C.±260° S. (Kofler) upon crystallization from ethyl acetate-hexane and in the latter case the monoacetonide diacetate is obtained, m.p. 140° C.–144° C. (Kofler) after crystallization from hexane. As outlined above, the present invention provides also a method for isolating the hormones mentioned above in a quick and convenient way. The total crystallizate T which contains the polyhydroxylated sterol fraction is tested by chomatography on a thin layer (solvent system: methylene chloride 25, methonal 5, benzene 5.3% vanillin in alcohol reagent+0.5 ml. of $H_2SO_4$ concentrated, at 120° C. for 10 minutes) and is subjected to a separation process which is based on the different solubility of these substances in water and organic solvents. Thus, by taking up with distilled water, if necessary in hot conditions, the total crystallizate (T) (free from alkaloids), transfers into the aqueous solution the crustecdysone (ecdysterone). This operation is repeated a number of times until a thin layer chromatographic test shows that the intensity of the yellow spot of crustecdysone has been reduced in the water insoluble fraction (A) until becoming definitely weaker than the violet one of makisterone and than the blue spot.

To the aqueous solutions, enriched with crustecdysone (ecdysterone), methanol has been added until a methanol concentration as high as 40% by volume is reached and the resulting solution is subsequently evaporated to ⅕ of the original volume. Thus, after cooling, a fraction is separated, which contains makisterone A, and crustecdysone in almost equal proportions, as can be seen from a thin layer chromatographic test performed as specified above. This product (C) is removed from the concentrate by filtration. The mother liquors are evaporated to dryness at a low temperature and the residue is repeatedly crystallized from a methanol-acetone mixture (1:5) until chromatographically pure. Crustecdysone (ecdysterone) thus obtained has a m.p. 239° C.–242° C. (decomposition), $[\alpha]_D^{20}=+59°\pm1°$ (c.=1 in methanol). In addition, when treated with an excess of acetic anhydride in cold pyridine, it gives an acetyl-derivative having a m.p. of 153° C.–157° C.

The water-insoluble fraction (A) as such, that is still water-logged, is taken up with hot pure methanol. Upon cooling to room temperature, the insoluble portion (B) is collected on a filter. The aqueous methanol solution thus obtained contains, on thin layer chromatographic examination, the remaining crustecdysone which was present in the water insoluble fraction of the total crystallizate, together with ecdysone. The further purification of ecdysone is carried out by resorting to the lesser water solubility of the latter substance. Thus, by simple and repeated crystallization from distilled water, ecdysone in a perfectly pure state can be obtained. This substance has the following physical and chemical specifications:

M.p. 160° C.–163° C.: the melted liquid solidifies again and melts again at 230° C.–240° C.

$[\alpha]_D^{20}=+65.7°\pm1°$ (c.=1.033 in ethanol).

$\lambda_{max.}$=242 nm. (log $\epsilon$=11960); by treatment with hot acids for one hour two new absorptions appear at 244 and 297 nm.

$\lambda_{max.}$ (KBr) 3650–3100, 1650, 1450, 1385, 1055, 880 cm.$^{-1}$.

Furthermore, by treating ecdysone, in pyridine, with an excess of cold acetic anhydride, one obtains a triacetyl derivative having a m.p. of 85° C.–95° C. One then proceeds with the isolation, from the insoluble fraction (B), of the pure makisterone A by repeated crystallizations of said residue, firstly from methanol alone, and subsequently, up to chromatographic purity, from methanol which contains 1% water. The thus obtained makisterone A has a m.p. 258° C.–260° C.; $[\alpha]_D^{20}=+65°\pm1°$ (c.=0.5 methanol). Also makisterone A gives by treatment with acetic anhydride in pyridine an acetyl derivative which has a m.p. of 237° C. The mother liquors coming from the several crystallizations are combined and are evaporated to dryness at a low temperature (D). The residue (D) is combined with the residue (C), and the whole is dissolved in methanol, the methanol solution is evaporated to dryness in a vacuo at a low temperature and the thus obtained residue (E) is subjected to a new separation process, as such or combined with a new lot of the total crystallizate (T).

As an alternative the residues (D) and (C), can be used for extracting, as pure substances, other polyhydroxylated steroids as contained in the crystallizate T.

The chromatographic examination of the residue (D) as carried out with the technique repeatedly recalled above shows the presence of a spot at R*f* of about 0.23 of a green colour which indicates the presence of the new substance, that is, muristerone. It has been ascertained that it can be isolated from the residue (D) by chromatography on a column of silica gel and is contained in the fractions eluted by chloroform containing from 5 to 10% of methanol by volume.

Upon evaporation of these eluates to dryness a residue is obtained, which, as crystallized from ethyl acetate, is composed by a crystalline product, having a m.p. (corrected) of 227° C.–230° C., readily soluble in water and having an empirical formula $C_{27}H_{44}O_8$.

Muristerone, by treatment with acetic anhydride in pyridine, gives a tetra-acetyl derivative which, as crystallized from ethyl acetate-hexane (1:1) has a m.p. (corr.) of 236° C.–238° C.

The following examples are intended as being illustrative only without limiting the present invention.

EXAMPLE 1

Kaladana seeds (20 kilograms) are ground in a disk mill having a foraminous sector with 30 holes per square centimeter. The ground drug is defatted by extraction by cold ligroin (boiling range 60° C.–90° C.). Three sequential extractions are sufficient each with 35 liters of gasoline, with stirring and for five hours. The degreased material is then extracted, with stirring, for two consecutive times with 60 liters of a chloroform-methanol-aqueous ammonia in the respective volume ratios of 9:0.9:0.1. Each extraction step lasts twelve hours and is carried out at room temperature.

Two sequential extractions are then carried out, each of which lasts three hours, still with stirring, with 50 liters of chloroform. This step is carried at room temperature.

Each time the extraction liquor is removed from the drug by filtration under reduced pressures.

All of the extracts are combined and concentrated under reduced pressures at a temperature not in excess of 40° C., down to a volume of ten liters. The concentrate is allowed to stand in a refrigerator for a few days until no more crystalline product is separated. The separated material is collected on a filter by suction, is washed on the filter with a small amount of chloroform and subsequently with petroleum ether and then dried in vacuo. Further amounts of raw product can be obtained by evaporating the mother liquors and with a subsequent stay in a refrigerator. The yield obtained is 140 grams.

A thin layer (silica gel G) chromatographic analysis using as a solvent a chloroform-ethanol-water mixture (80:19:1) and as a spot detector the vanillin-sulphuric acid reagent, by heating to 120° C. for 10 minutes, shows the spots which have been reported above and the R*f* of these compounds are: 0.22 (blue spot); 0.20 (violet spot); and 0.15 (yellow spot), respectively.

EXAMPLE 2

120 grams of total crystallizate (T) as obtained according to Example 1 are slurried in 1000 mls. distilled water. The slurry is mechanically stirred during one hour at a temperature of 25° C. The slurry, is then filtered under suction. The filtrate is set aside and the filter cake is subjected to new subsequent treatments with water, under the same conditions as reported above. The quantity of water which is employed for the subsequent treatments is always 1000 mls. each time.

After the fourth treatment, the thin layer chromatographic examination carried out as described above, shows that the yellow spot of crustecdysone, in the cake (10 gs.) as resulting from the washings with water, is definitely weaker than the violet spot of makisterone A and then the blue one of ecdysone.

To the combined aqueous filtrates (4,000 mls.) methanol (1,600 mls.) was added and the solution thus obtained is evaporated in vacuo at a maximum temperature of 35° C. to a volume of 1100 mls. approx. The concentrate is cooled on an ice bath and the crystalline product which has been separated (30 grams) is collected on a filter.

This product (C) when examined by the thin layer chromatographic testing procedure many times recalled above, is composed by makisterone A and crustecdysone. The mother liquors of (C) are then dried in vacuo at a temperature not over 35° C. The residue which has been obtained is crystallized many times from a mixture of methanol and acetone in the ratio of 1:5 until it is chromatographically pure. The thus obtained crustecdysone (ecdysterone) has the physical and chemical properties as before reported.

The water insoluble portion of the total crystallizate (A) as such, that is, still waterwet, is taken up in pure methanol on a water bath at 50° C. Subsequently, the mass is cooled to room temperature. The product which has been separated is collected on a filter (B). The methanol filtrate from which (B) has been separated shows, at the chromatographic examination as above, that it contains crustecdysone and ecdysone. The separation of ecdysone is carried out by evaporating to dryness in vacuo the filtrate at a low temperature (35° C.). The residue thus obtained is then subjected to repeated crystallizations from distilled water. At least three crystallizations are required to obtain a chromatographically pure product. 1500 mls. water are required for 7.5 grams of residue.

Final purification of the product after being dried in vacuo, is achieved by recrystallization from ethyl acetate. The ecdysone thus obtained has a m.p. of 230° C.–240° C. along with other chemical and physical specifications as reported in the foregoing.

The insoluble residue (B), about 15 grams is firstly crystallized from: methanol (50 mls.) and subsequently from methanol which contains 1% by volume of water until a chromatographically acceptable purity is obtained. The product thus obtained is the makisterone A. It has all of the chemical specifications indicated in the foregoing. The mother liquors coming from all the various crystallizations are combined and evaporated to dryness, in vacuo, at a temperature below 35° C. The residue thus obtained (D) is combined with the residue (C); the whole is dissolved in methanol and the methanol solution is evaporated to dryness in vacuo at a low temperature, the residue thus obtained (E) is then subjected to a new separation run either as such or combined with a new lot of total crystallizate (T1).

The residue (D) (21 grams) admixed with 50 grams of silica gel (particle size 0.05 mm. to 0.2 mm.) is charged into a column which has been prepared with 600 grams of the same silica gel. Elution is carried out first with chloroform-methanol 95:5. The dry residue of these eluates is discarded. The subsequent four fractions with chloroform-methanol 90:10 (one liter) give a residue, which according to the thin layer chromatography, contains the new green-spot substance. The residue is newly subjected to chromatography on a new column as above until purity is attained, by eluting with chloroform-methanol 95:5 only. The new eluates, evaporated to dryness, give a residue which, when recrystallized from ethyl acetate, gives a product having a m.p. of 227°–230° C. (corrected) namely muristerone. IR in KBr cm.$^{-1}$ 3600–3200; 1660; 1630.

U.V. in MeOH 236 nm.; D.O. 0.994 52.58 ml. ($\epsilon$=9050). $[\alpha]_D^{20}=+49.6°\pm1°$ (c.=1.02 in pyridine).

EXAMPLE 3

Crustecdysone triacetate 0.15 grams of the crustecdysone (ecdysterone) obtained in example 2 are dissolved in 5 mls. pyridine (anhydrous) and treated with 2 mls. acetic anhydride at room temperature for 24 hours. The solution is poured into ice water and the precipitate found is collected on a filter, dried and repeatedly crystallized from ethyl acetate/n-hexane.

There are obtained 0.056 milligrams of a crystalline solid having a m.p. of 153° C.–157° C. which is recognized to be ecdysterone triacetate.

*Analysis.*—Calculated for $C_{33}H_{50}O_{10}\cdot H_2O$ (percent): C, 63.46; H, 8.33. Found (percent): C, 63.64; H, 8.36. $[\alpha]_D^{20}=+59°\pm1°$ (c.=1 in methanol).

(Aust. J. Chem., *22*, 1045 (1969)—m.p. 198.5° C.–199° C. for the hemihydrate $[\alpha]_D^{20}=\pm59°$.)

EXAMPLE 4

Makisterone triacetate 0.2 grams of makisterone as obtained in Example 2 are treated as described above for crustecdysone. On crystallization from ethyl acetate/n-hexane 0.15 grams of makisterone triacetate are obtained having a m.p. of 237° C. (Tet. Lett., 3883 (1966), 210–213).

*Analysis.*—Calculated for $C_{34}H_{52}O_{10}$ (percent): C, 65.80; H, 8.38. Found (percent): C, 65.38; H, 8.40. $[\alpha]_D^{20}=+74°\pm1°$ (c.=1 in methanol).

EXAMPLE 5

Ecdysone triacetate 0.10 grams of the ecdysone as obtained in Example 2 are treated as described above.

The solid residue is subjected to chromatography on silica, using a chloroform-methanol (99:1) mixture as the eluent. The individual fractions are combined and crystallized from hexane; 45 milligrams of an amorphous solid having a m.p. of 85°–95° C. are obtained.

EXAMPLE 6

Muristerone tetraacetate 300 milligrams of muristerone as obtained as described in Example 2, dissolved in 4 mls. of anhydrous pyridine supplemented by 2 mls. of acetic anhydride are allowed to stand at room temperature for 24 hours. The reaction mixture is poured into an excess of water. The separated product is dried and purified by chromatography on a silica gel column (0.05–0.2) by eluting with chloroform-methanol 98:2. The residue, as obtained by evaporating the eluates is recrystallized from ethyl acetate-hexane 1:1; m.p. 236° C.–238° C.

IR spectrography in KBr, characteristic bands at: 3600–3300; 1740; 1720; 1680; 1250 $cm.^{-1}$ As outlined above, an extremely important property of the total crystallizate aforementioned, as obtained according to the present invention, lies in its virtually insecticidal activity and, anyhow, its protective activity for agricultural cultures. As a matter of fact, practical field tests with solutions containing 0.1% to 0.2% of total crystallizate have shown the insecticidal and culture-protecting activity against noxious insect species belonging to several classes such as Lepidoptera (more particularly *Pieris brassicae* and *Bombyx mori*), Coleoptera (especially *Doriphora decemlineata*) and others.

It is sometimes advisable that the active principle be associated to appropriate dispersants, in order to secure an even spreading of the active principle itself.

Still more, the formulations can provide for the addition of synthetic or natural synergistic substances so as to strengthen or to widen the active spectrum of the preparation.

An equally important aspect of the wide-spectrum biological insecticide of the present invention lies in its specific activity and thus in its substantially inactivity towards the other forms of vegetable and/or animal life.

The embodiments of the invention in which an exclusive property or privilege is claimed are defined as follows:

1. A method for the extraction of insect molting steroid hormones comprising
   grinding seeds of Kaladana plants to a coarse flour,
   defatting the flour with a hydrocarbon solvent,
   extracting the defatted material with a mixture of a chlorinated aliphatic hydrocarbon, an aliphatic alcohol containing from 1 to 4 carbon atoms, and an organic base selected from the group consisting of ammonia and aliphatic amines,
   evaporating the extracted fractions in vacuo at a temperature not over 40° C.,
   thoroughly washing them, and
   separating the crystalline residue.

2. A method for the extraction of insect molting steroid hormones comprising
   grinding seeds of Kaladana plants to a coarse flour,
   defatting the flour with a hydrocarbon solvent,
   extracting the defatted material with a mixture of a chlorinated aliphatic hydrocarbon, an aliphatic alcohol containing from 1 to 4 carbon atoms, and an organic base selected from the group consisting of ammonia and aliphatic amines,
   concentrating the extracted fractions,
   thoroughly washing them, and
   separating the crystalline residue,
said chlorinated aliphatic hydrocarbon solvent being selected from the group consisting of chloroform, carbon tetrachloride, methylene chloride and trichloroethylene.

3. A method for the extraction of insect molting steroid hormones comprising
   grinding seeds of Kaladana plants to a coarse flour,
   defatting the flour with a hydrocarbon solvent,
   extracting the defatted material with a mixture of a chlorinated aliphatic hydrocarbon, an aliphatic alcohol containing from 1 to 4 carbon atoms, and an organic base selected from the group consisting of ammonia and aliphatic amines,
   concentrating the extracted fractions,
   thoroughly washing them, and
   separating the crystalline residue,
said extraction mixture being composed by chloroform, methanol and ammonia, in the ratios 9 to 0.9 to 0.1.

4. A method for the extraction of insect molting steroid hormones comprising
   grinding seeds of Kaladana plants to a coarse flour,
   defatting the flour with a hydrocarbon solvent,
   extracting the defatted material with a mixture of a chlorinated aliphatic hydrocarbon, an aliphatic alcohol containing from 1 to 4 carbon atoms, and an organic base selected from the group consisting of ammonia and aliphatic amines,
   concentrating the extracted fractions,
   thoroughly washing them, and
   separating the crystalline residue,
the total crystallizate being taken up with distilled water, so that crustecdysone passes into the aqueous phase, leaving a water-insoluble residue (A), washing the residue (A) repeatedly a number of times up to the virtually total extraction of crustecdysone; adding methanol to the combined aqueous solutions until a concentration of methanol of up to 40% by volume is obtained, and then evaporating the solutions by heating to one fifth of the original volume, to obtain a concentrate, cooling the concentrate to obtain a solid fraction (C), that separates out while evaporating the liquid phase to dryness, and crystallizing the resultant solid residue many times from a mixture of methanol and acetone in the ratio of 1 to 5 until chromatographically pure crustecdysone is obtained.

5. A method according to claim 4, wherein said insoluble portion (A) is taken up in hot pure methanol, so that upon cooling a methanol solution is obtained which contains ecdysone and the residual crystecdysone and an insoluble phase (B) containing makisterone A, and subjecting the thus obtained methanol solution to repeated crystallizations from distilled water until perfectly pure ecdysone is obtained.

6. A method according to claim 5, wherein said insoluble phase (B) is subjected to repeated crystallizations, the first time from pure methanol and the subsequent times from methanol containing 1% of water until chromatographically pure makisterone A is obtained.

References Cited

UNITED STATES PATENTS

| | | | |
|---|---|---|---|
| 2,963,494 | 12/1960 | Cunningham | 260—397.25 |
| 2,866,797 | 12/1958 | Berry et al. | 260—397.25 |
| 3,433,814 | 3/1969 | Takemoto et al. | 260—397.25 |
| 3,527,777 | 9/1970 | Jizba et al. | 260—397.25 |

ELBERT L. ROBERTS, Primary Examiner

U.S. Cl. X.R.

424—238